(12) United States Patent
Ji

(10) Patent No.: US 7,885,213 B2
(45) Date of Patent: Feb. 8, 2011

(54) SYSTEM AND METHOD FOR ASYNCHRONOUS BUSY-TONE MULTIPLE ACCESS WITH ACKNOWLEDGMENT FOR AD HOC WIRELESS NETWORKS

(75) Inventor: Baowei Ji, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1018 days.

(21) Appl. No.: 11/282,183

(22) Filed: Nov. 18, 2005

(65) Prior Publication Data
US 2006/0153107 A1 Jul. 13, 2006

Related U.S. Application Data

(60) Provisional application No. 60/643,721, filed on Jan. 13, 2005.

(51) Int. Cl.
H04B 1/44 (2006.01)
(52) U.S. Cl. .................. 370/282; 370/278; 455/434
(58) Field of Classification Search ............. 370/278; 455/434, 445
See application file for complete search history.

(56) References Cited

U.S. PATENT DOCUMENTS 5,884,171 A * 3/1999 Tanabe et al. ............ 455/434
7,061,877 B1 * 6/2006 Gummalla et al. ........ 370/278

OTHER PUBLICATIONS

Ajay Chandra V. Gummalla and John O. Limb; Wireless Collision Detect (WCD): Multiple Access with Receiver Initiated Feedback and Carrier Detect Signal; Georgia Institute of Technology, Atlanta, GA; pp. 397-401; 2000, IEEE.
Zygmunt J. Haas and Jing Deng; Dual Busy Tone Multiple Access (DBTMA)—A Multiple Access Control Scheme for Ad Hoc Networks; IEEE Transactions on Communications, vol. 50, No. 6, Jun. 2002; pp. 975-985.
Fouad A. Tobagi and Leonard Kleinrock; Packet Switching in Radio Channels: Part II—The Hidden Terminal Problem in Carrier Sense Multiple-Access and the Busy-Tone Solution; IEEE Transactions on Communications, vol. Com-23, No. 12, Dec. 1975; pp. 1417-1433.
Cheng-Shong Wu and Victor O.K. Li; Receiver-Initiated Busy-Tone Multiple Access in Packet Radio Networks; University of Southern California, Los Angeles; 1988 ACM; pp. 336-342.

* cited by examiner

Primary Examiner—Albert T Chou

(57) ABSTRACT

The present disclosure relates generally to a system and method for asynchronous busy-tone multiple access with acknowledgement for ad hoc wireless networks. In one example, a method for use in an ad hoc network using a tone emitted by a receiving node includes receiving a first portion of a packet from a sending node, where the first portion of the packet contains a destination address of the packet. A tone is emitted by the receiving node if the receiving node determines that the received destination address matches an address of the receiving node. The receiving node receives a second portion of the packet containing a request for transmitting data from the sending node to the receiving node, and the tone is emitted for at least a predefined period of time after receiving the request.

33 Claims, 6 Drawing Sheets

SYSTEM AND METHOD FOR ASYNCHRONOUS BUSY-TONE MULTIPLE ACCESS WITH ACKNOWLEDGMENT FOR AD HOC WIRELESS NETWORKS

CROSS-REFERENCE

This application claims priority from U.S. Provisional Application Ser. No. 60/643,721, filed on Jan. 13, 2005, which is incorporated herein by reference.

This application is related to U.S. patent application Ser. No. 11/283,146, filed on Nov. 18, 2005, and entitled "SYSTEM AND METHOD FOR ASYNCHRONOUS WIRELESS COLLISION DETECTION WITH ACKNOWLEDGEMENT FOR AD HOC WIRELESS NETWORKS, which claims priority from U.S. Provisional Application Ser. No. 60/647,897, filed on Jan. 28, 2005.

BACKGROUND

An ad hoc wireless network is a collection of devices (e.g., nodes) capable of wirelessly communicating and networking. Generally, ad hoc wireless networks operate in a distributed, not-fully-connected, asynchronous, and mobile manner. Examples of ad hoc networks include wireless sensor networks, packet radio networks, and wireless mesh networks. An ideal ad hoc network provides multi-hop transmission, high mobility, self-organization, seamless handover, quality of service (QoS), and high spectrum efficiency.

In general, nodes in an ad hoc network are distributed and an ad hoc network has no central controllers, such as access points (AP) in a wide local area network (WLAN) environment or base stations (BS) as described with respect to IEEE 802.16. Therefore, nodes within an ad hoc network cannot rely on a central control architecture to synchronize communications and prevent collisions. Furthermore, an ad hoc network is not guaranteed for full connection (e.g., some nodes may not be able to hear each other), which results in hidden-node and exposed-node problems.

A hidden node is within the coverage of a receiving node, but is outside of the coverage of a sending node that is transmitting to the receiving node. If the hidden node is transmitting at the same time as the sending node is transmitting, the hidden node's transmission will cause interference with the receiving node and will prevent the receiving node from receiving a message from the sending node. An exposed node is a node that is within a sending node's coverage, but outside the receiving node's coverage. The exposed node will not be able to receive while the sending node is transmitting. However, the exposed node may transmit to another receiving node outside of the sending node's coverage without causing interference. For reasons such as these, the design of media access control (MAC) protocols for ad hoc networks is challenging.

SUMMARY

In one embodiment, a method for use in an ad hoc network using a tone emitted by a receiving node is provided. The method includes receiving a first portion of a packet from a sending node at the receiving node, where the first portion of the packet contains a destination address of the packet. The receiving node emits a tone if the receiving node determines that the received destination address matches an address of the receiving node. The receiving node receives, from the sending node, a second portion of the packet containing a request for transmitting data from the sending node to the receiving node, and the receiving node continues to emit the tone for at least a first predefined period of time after receiving the request.

In another embodiment, a method for use in an ad hoc network using a tone emitted by a receiving node is provided. The method includes attempting, by a sending node, to detect a tone emitted by the receiving node. The sending node sends a request for a data transmission to the receiving node if no tone is detected. The sending node determines whether a detected tone remains on for a first predefined period of time after sending a request to transmit data to the receiving node.

In yet another embodiment, a method for use in an ad hoc network is provided. The method includes sending an initial portion of a request from a first node and determining, by a second node receiving the initial portion of the request, whether the request is intended for the second node. A tone is emitted by the second node if the request is intended for the second node, where a remaining portion of the request is received by the second node while the tone is being emitted, and wherein the tone is emitted for a first time period after the remaining portion is received. The first node then determines whether the tone is emitted by the second node for a second time period beginning after the remaining portion of the request is sent to the second node, and data is sent from the first node to the second node if the tone is emitted for the entire second time period.

In still another embodiment, a receiving node for use within an ad hoc network is provided. The receiving node includes a wireless communication system, a processor coupled to the wireless communication system, and a memory containing a plurality of instructions for execution by the processor. The instructions include instructions for receiving an address portion of a request packet from a sending node, where the address portion includes a destination address of the request packet, and comparing the destination address with an address of the receiving node. The instructions also include instructions for emitting a tone while receiving a remaining portion of the request packet if the destination address matches the address of the receiving tone, where the tone is emitted for a first time period after the entire remaining portion is received.

In another embodiment, a sending node for use within an ad hoc network is provided. The sending node includes a wireless communication system, a processor coupled to the wireless communication system, and a memory containing a plurality of instructions for execution by the processor. The instructions include instructions for sending a request packet to a receiving node if a tone is not detected and starting a timer of a first time period after the entire request sent, where the first time period is at least equal to a maximum two-way propagation delay of a coverage area of the sending node. The instructions also include instructions for sending a data packet to the receiving node only if the tone is emitted during the entire first time period.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1b is a block diagram of one embodiment of a node within the ad hoc wireless network of FIG. 1a.

FIG. 4 is a diagram of one embodiment of a timing sequence that describes the timing of events between a sending node and receiving node in the network of FIG. 1a.

FIG. 5 is a diagram of another embodiment of a timing sequence that describes the timing of events between a sending node and receiving node in the network of FIG. 1a.

FIGS. 7a-7d illustrate four scenarios that may occur within the network of FIG. 1a.

DETAILED DESCRIPTION

Figure 1A:
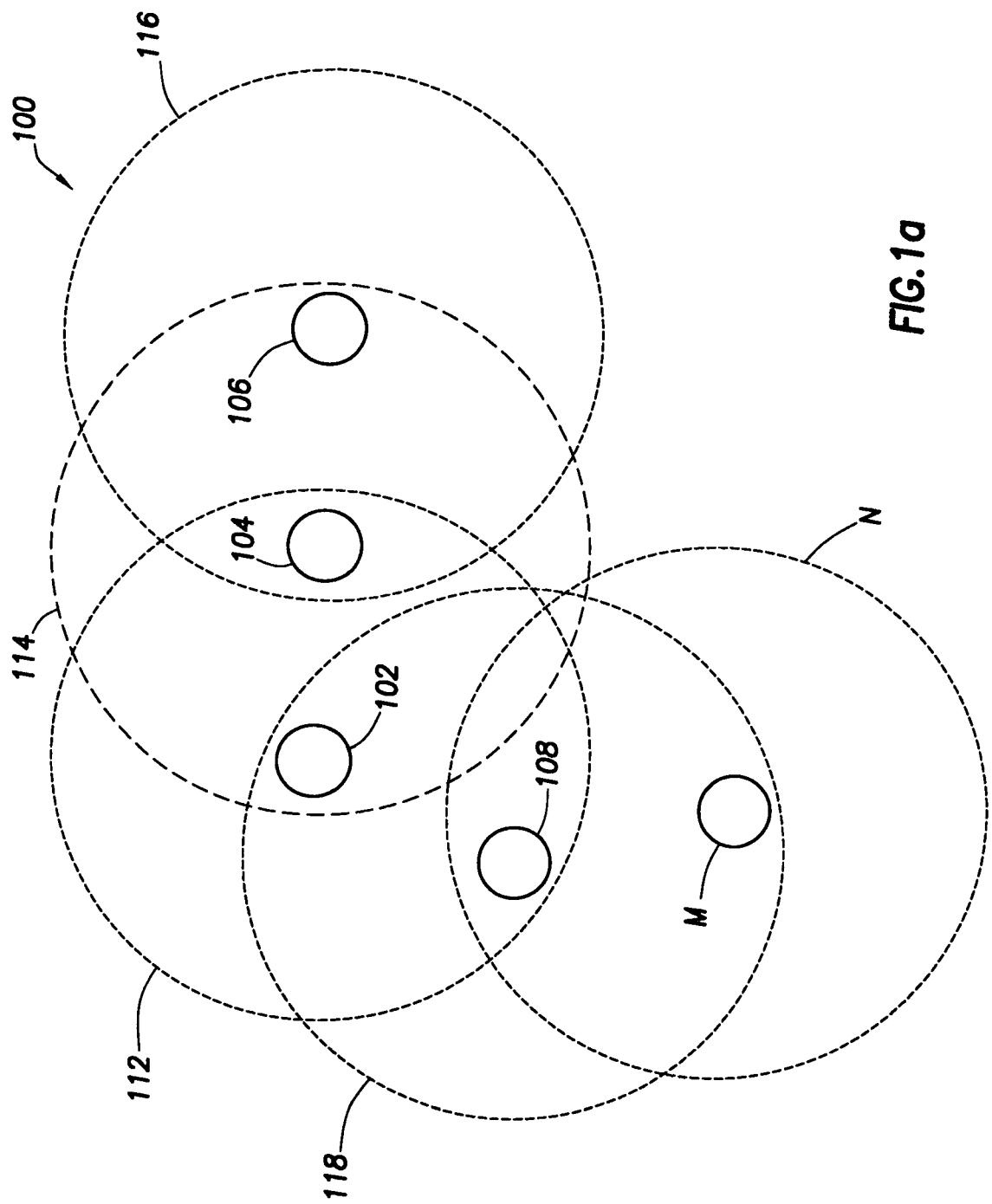
FIG. 1a is a diagram of one embodiment of an ad hoc wireless network.

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

For purposes of convenience, the following notations will be used throughout the remainder of this disclosure.

$\Gamma$ maximum one-way propagation delay
$\tau$ one-way propagation delay, $0 < \tau \leq \Gamma$
$\gamma_a$ length of Request to Send (RTS) header for destination address
$\gamma$ total length of RTS packet
$\Delta_1$ RTS header acknowledgement duration
$\Delta_2$ data acknowledgement duration
$\delta$ data transmission duration Referring to FIG. 1a, in one embodiment, an ad hoc wireless network 100 is configured with multiple nodes 102, 104, 106, 108, . . . , M. Each node 102-M has an associated coverage area 112, 114, 116, 118, . . . , N, respectively, within which each node may send information to other nodes within the network 100. It is understood that the coverage areas for a particular node 102-M may not be equal and that the shape of a coverage area may not correspond to a circle as shown. Furthermore, different nodes may have different coverage areas, and a coverage area for a single node may vary depending on the environment, available power, and other factors. The ad hoc network 100 may be any type of ad hoc network, including wireless sensor networks, packet radio networks, and wireless mesh networks.

Figure 1B:
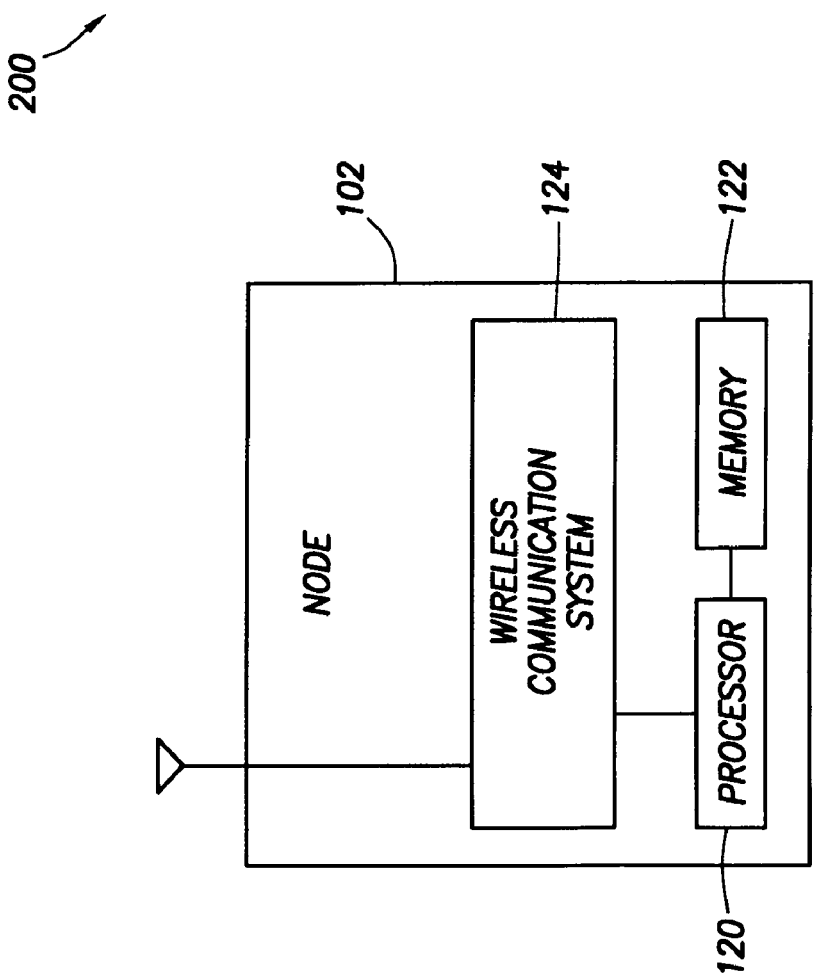

With additional reference to FIG. 1b, one embodiment of the node 102 of FIG. 1a is illustrated. A processor 120 is coupled to a memory 122 and a wireless communications system 124. The memory 122 contains instructions for execution by the processor 120 for sending and receiving wireless communications via the wireless communications system 124. Although not shown, it is understood that the node 102 may include other components, such as a microphone, speaker, and keys for manual data entry and for controlling the node 102. Each node 102-M may be any type of wireless device capable of using the network 100 of FIG. 1a.

Examples of such devices include laptop computers, personal digital assistants (PDAs), and cellular phones.

Figure 7A:
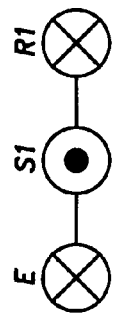
Figure 7B:
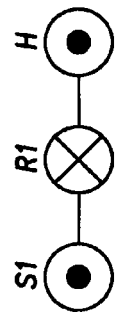

Referring again specifically to FIG. 1a, as an illustration of the previously described hidden-node problem, assume that the node 102 is a sending node and the node 104 is a receiving node. Because the node 106 is within the coverage area of the node 104 but the node 106 is not within the coverage area of the node 102, the node 106 is hidden from the node 102. Therefore, both the node 102 and the node 106 may try to transmit to the node 104. The two transmissions may create interference that will prevent the node 106 from successfully receiving either transmission, as illustrated in FIG. 7b.

As an illustration of the previously described exposed-node problem, assume that the node 102 is a sending node and the node 104 is a receiving node. Because the node 108 is within the coverage area of the node 102, the node 108 is an exposed node that may not be allowed to transmit while the node 102 is transmitting, as illustrated in FIG. 7a. However, because the node 104 is not within the coverage area 118 of the node 108, a transmission by the node 108 would not affect the reception of the node 104. Therefore, the node 108 should be allowed to transmit to other nodes (e.g., to the node M), despite its proximity to the node 102.

Some previous attempts for solving hidden/exposed-node problems have relied on an RTS-CTS (Clear To Send) mechanism. In one approach using this mechanism, before a sending node $S_1$ sends data to a receiving node $R_1$, $S_1$ first sends out an RTS packet to which $R_1$ should respond with a CTS packet. All nodes that hear the RTS defer long enough for $S_1$ to receive the CTS packet. All nodes that hear the CTS defer long enough for $R_1$ to finish receiving the data that follows. After a successful RTS-CTS handshake, $S_1$ can start sending data to $R_1$. However, in this mechanism, exposed nodes cannot complete the RTS-CTS handshake cycle and concurrent transmission is inhibited. While an exposed node is allowed to send an RTS, it cannot receive a CTS due to the interference from $S_1$'s transmission. Another approach suggests a possible solution by explicitly terminating the transmission attempt of exposed nodes by using RTS-CTS-DS (Data Sending) handshaking, together with other protocol enhancements. However, neither approach solves the hidden-node problem because of possible CTS collisions.

In a CTS collision, while $R_1$ is sending a CTS to $S_1$, a hidden node H may be sending out some packets. In this case, H does not hear $R_1$'s CTS, and the nodes within the coverage of both $R_1$ and H may not be able to detect the transmissions from $R_1$ and H. However, these nodes may not defer their transmissions and may destroy the receiving ability of $R_1$. One possible solution uses CTS's dominance over RTS to resolve this CTS collision problem. More specifically, a CTS packet is required to be long enough that the hidden node H will hear at least part of the CTS packet even after it sends out a whole RTS packet. H either receives the CTS and does not transmit, or detects the noise due to the remainder of the CTS packet and stops transmitting. However, a problem with this CTS-dominance approach is that a node cannot tell the difference between an RTS collision and a CTS collision. Whenever a collision is detected, the involved node backs off. This may result in long backoff periods that substantially limit the total network throughput.

One possible solution to the hidden node problem requires a receiver to power up a busy tone (BT) to warn hidden nodes of its receiving activity. For example, the busy tone can be an unmodulated sine wave out of the data channel, although the busy tone does not have to occupy significant spectrum compared with the spectrum of data channel. However, this busy tone multiple access (BTMA) solution was designed for centralized networks where a centralized controller, such as an access point, controls the busy tone. BTMA may be extended for packet radio networks by having all the nodes within the sender's coverage turn on a busy tone, which solves the hidden-node problem. However the cost of BTMA is high, as no concurrent transmissions are allowed within the double radius of the sender. Moreover, the exposed-node problem may be intensified.

A possible alteration of the BTMA approach, called receiver-initiated BTMA (RI-BTMA), is to have only the targeted receiver turn on the busy tone. Then, if $S_1$ does not sense a busy tone, $S_1$ will first transmit a preamble containing $R_1$'s address and will not begin transmitting data until it hears a busy tone. Having received the preamble and recognizing its own address in the preamble, $R_1$ then powers up the busy tone and is ready to receive data. However, the RI-BTMA approach does not eliminate hidden nodes.

To address hidden nodes, a wireless collision detection (WCD) approach may be implemented using two busy tones. Upon detecting transmission activity, all receivers power up a carrier detect (CD) tone and continue receiving the header part of the data packet. After receiving the data header, only the targeted receiver whose address matches the address in the header will switch from the CD tone to a feedback tone (FT). All other receivers eventually turn off their CD tone. The sender will abort the data transmission if the FT tone is not sensed after a certain number of time slots. The CD tone provides an immediate warning to hidden nodes of the ongoing data transmission, but at the cost of unnecessary warnings to other nodes within the double radius of the sender.

Both RI-BTMA and WCD are based on slotted operation mode. However, synchronization is generally difficult to achieve in wireless ad hoc networks. Another approach, called dual busy tone multiple access (DBTMA), is to use two physically separate tones, one for transmitting (BTt) to warn all nodes within the sender's coverage of the transmission, and the other for receiving (BTr) to warn all nodes within the receiver's coverage. In DBTMA, when $S_1$ is ready to transmit data to $R_1$, it determines whether either BTt or BTr are on. If neither tone is on, $S_1$ sends out an RTS packet and waits for $R_1$ to turn on BTr as an acknowledgement of correctly receiving the RTS. When $S_1$ hears BTr, it waits for $2\Gamma$ to allow BTr to reach all nodes within the coverage of $R_1$ and shut down any competing RTS packets (if any) sent by hidden nodes. $S_1$ then sends out the data packet. While DBTMA provides a data transmission that is free of collisions via the two busy tones, it may waste resources due to RTS collisions. More specifically, the time during which an RTS packet is being received is vulnerable because the targeted receiver will not turn on BTr until it successfully receives the entire RTS packet and the transmitting tone BTt has no affect on hidden nodes. Accordingly, system throughput is likely limited by RTS collisions due to competing transmissions from hidden nodes and BTt unnecessarily inhibits exposed nodes for up to the duration of the RTS packet.

Figure 2:
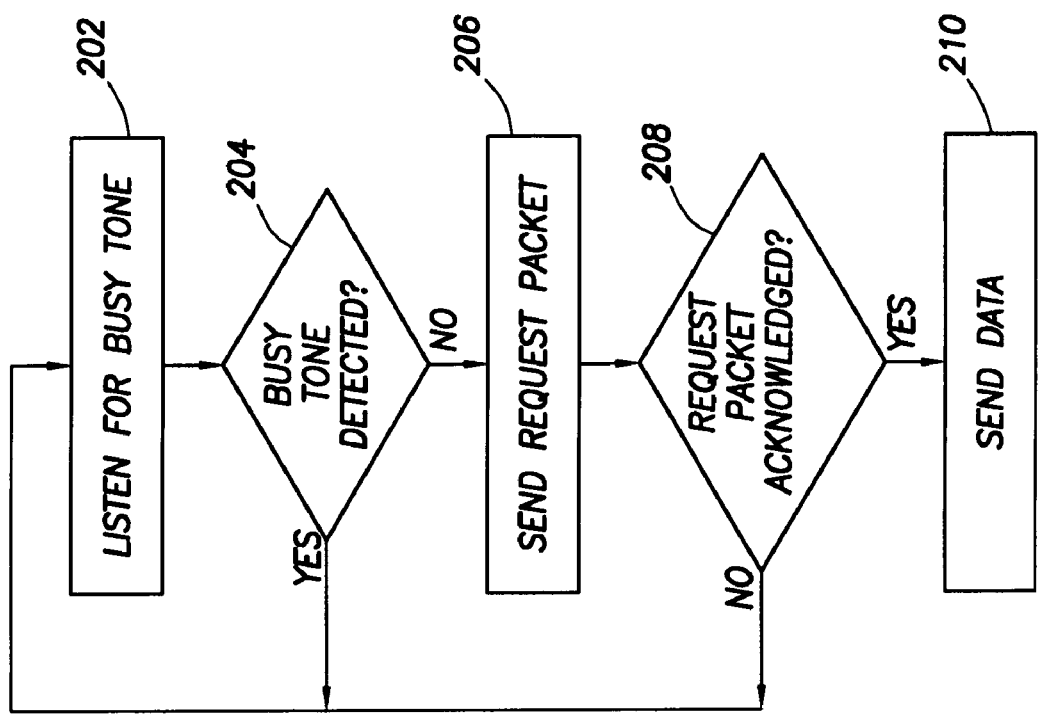
FIG. 2 is a flowchart of one embodiment of a method by which a sending node within the network of FIG. 1a can interact with a receiving node.

Referring to FIG. 2, in one embodiment, a method 200 illustrates how a sending node (e.g., the node 102 of FIG. 1) can determine whether to send data to a receiving node (e.g., the node 104 of FIG. 1). As will be described later in greater detail, the node 102 performs certain actions based on whether the node 104 is emitting a tone. Although busy tone is used for purposes of example throughout this disclosure, it is understood that other types of tones may be used to implement the present invention, and that the term "busy tone" is representative of other tones. The node 102 need not emit any tone and relies on the busy tone emitted by the node 104 to deal with the previously described exposed-node and hidden-node problems.

In step 202, the node 102 listens for a busy tone. If it detects a busy tone, as determined in step 204, it returns to step 202. This loop may repeat until the node 102 does not detect a busy tone or the request to send data is canceled. If no busy tone is detected, the node 102 sends a request packet (e.g., an RTS packet) in step 206 and determines whether the node 104 acknowledges the request packet in step 208. In the present example, the acknowledgement occurs when the node 104 leaves on the busy tone for a predefined period of time after the node 102 sends the request packet. It is understood that "predefined" may encompass both static and dynamically calculated time periods. For example, a static time period may be predefined because a particular time duration is set, while a dynamic time period may be predefined because it is calculated using a predefined process, relationship, or set of parameters. If the request packet is not acknowledged, the method returns to step 202. If the request packet is acknowledged, the method continues to step 210, where the node 102 sends data to the node 104.

Although not shown in FIG. 2, it is understood that the node 102 may also wait for an acknowledgement that the transmitted data has been received by the node 104. In some embodiments, the busy tone may be used by the node 102 to determine a channel quality, and the node 102 may then adjust its sending rate based on the channel quality.

Figure 3:
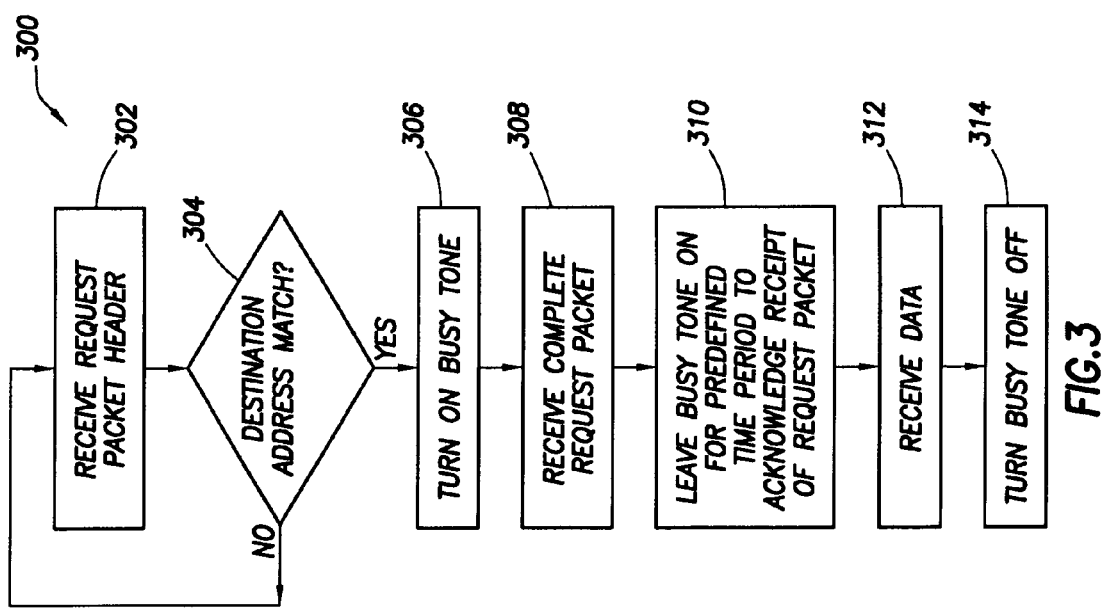
FIG. 3 is a flowchart of one embodiment of a method by which a receiving node within the network of FIG. 1a can interact with a sending node.

Referring to FIG. 3, in another embodiment, a method 300 illustrates how a receiving node (e.g., the node 104 of FIG. 1) can receive data from a sending node (e.g., the node 102 of FIG. 1) while preventing interference from other nodes. As will be described later in greater detail, the node 104 accomplishes this by emitting a busy tone. The node 102 need not emit any tone and relies on the busy tone emitted by the node 104 to deal with the previously described exposed-node and hidden-node problems.

In step 302, the node 104 receives a request packet (e.g., an RTS packet) header and, in step 304, determines whether the destination address in the header matches the address of the node 104. If there is not an address match, the method 300 returns to step 302 and waits for another request packet. If there is an address match, the node 104 turns on a busy signal in step 306 and receives the remainder of the request packet in step 308. After receiving the entire request packet, the node 104 leaves the busy tone on for a predefined period of time to acknowledge the receipt of the request to the sending node 102. The node 104 then receives the data corresponding to the request from the node 102 in step 312 and turns off the busy tone in step 314 after receiving the data. Although not shown in FIG. 3, it is understood that the node 104 may also acknowledge the receipt of the data using the busy tone.

Figure 4:
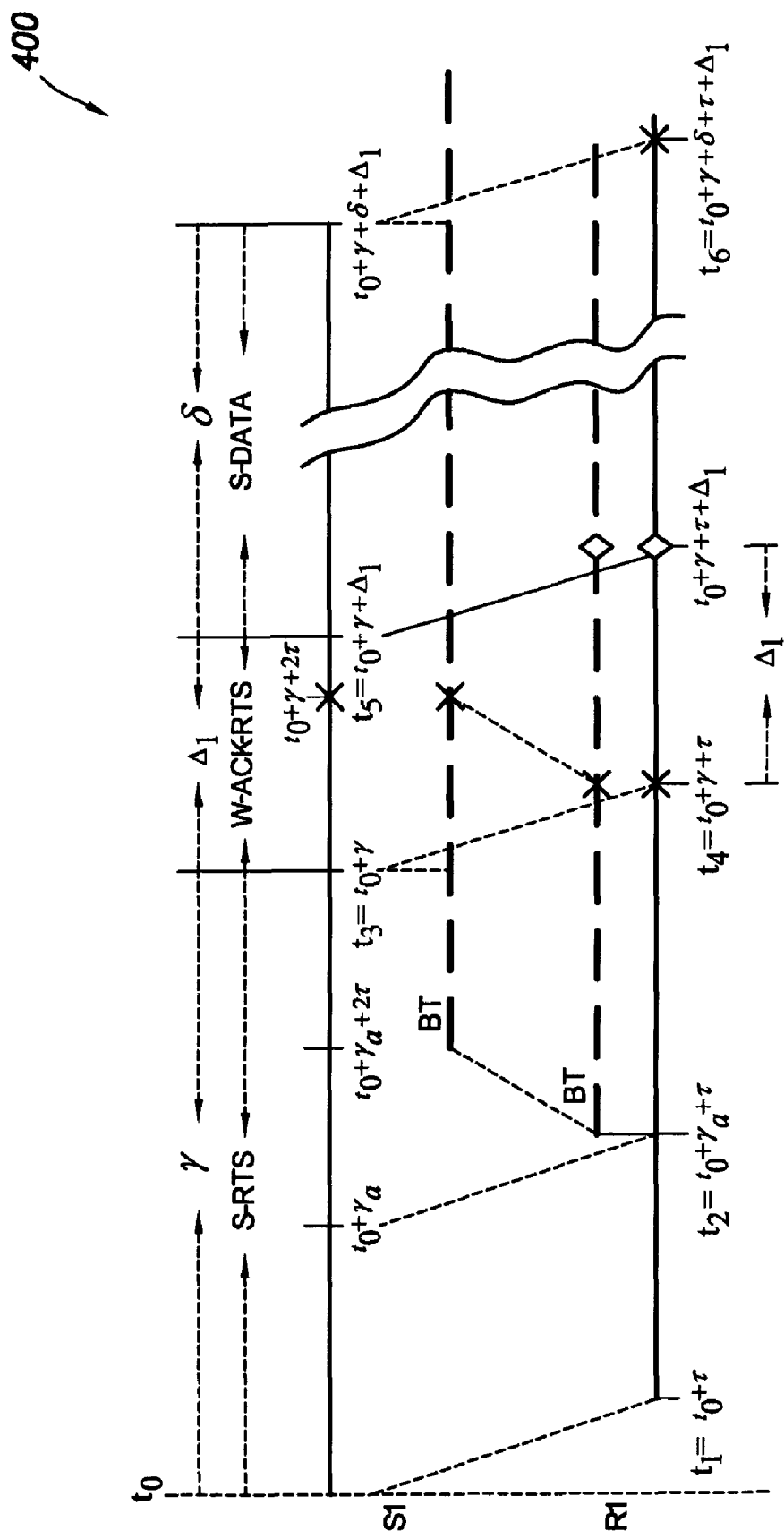

Referring to FIG. 4, in yet another embodiment, a timing diagram 400 illustrates the coordination of a sending node $S_1$ (e.g., the node 102 of FIG. 1) and a receiving node $R_1$ (e.g., the node 104 of FIG. 1) using an asynchronous busy-tone multiple access with acknowledgement (ABTMA/ACK) process. For example, the diagram 400 may be used to coordinate the methods 200 and 300 of FIGS. 2 and 3, respectively. The diagram 400 also includes three states (S-STS, W-ACK-RTS, and S-DATA) that will be described in greater detail with respect to FIG. 6.

In the present example, the node 102 is attempting to send data to the node 104, which is $\tau$ seconds away ($0 < \tau \leq \Gamma$). For purposes of clarity, the data processing time, transmit/receive turnaround time, and busy tone detection time are ignored in the diagram 400.

At time $t_0$, the node 102 prepares to begin transmitting. However, before doing so, it determines whether a node is sending out a busy tone. If the node 102 does not detect a busy tone, it begins transmitting an RTS packet having an address header identifying the node 104 as the destination address.

At time $t_1=t_0+\tau$, the first bit of the RTS header reaches the node 104.

At time $t_2=t_1+\gamma_a=t_0+\gamma_a+\tau$, the node 104 receive the complete RTS address header and recognizes the destination address as its own. Upon recognition of the address, the node 104 turns on a busy tone at $t_2$ to indicate that it is busy and that no other node (e.g., the node 106 of FIG. 1) should attempt to send data to it.

At time $t_3=t_0+\gamma$, the node 102 finishes sending the entire RTS packet, sets a timer for $\Delta_1$ seconds, and starts to monitor the busy tone for acknowledgement of the RTS transmission.

At time $t_4=t_3+\tau=t_0+\gamma+\tau$, the node 104 receives the RTS successfully, and continues to send the busy tone for $\Delta_1$ seconds to acknowledge the RTS transmission. In the present example, $\Delta_1$ should be larger than $2\Gamma$ in order to accommodate all possible locations of the node 104 with respect to the node 102 (e.g., the node 104 may be close to the node 102 or may be at the edge of the coverage area 112).

At time $t_5=t_3+\Delta_1=t_0+\gamma+\Delta_1$ the node 102 receives the acknowledgement provided by the busy tone and starts to send data. The node 102 finishes the data transmission at $t_5+\delta$, which ends the transmission cycle.

At time $t_6=t_5+\delta+\tau=t_0+\gamma+\delta+\tau+\Delta_1$, the node 104 finishes receiving the data and turns off the busy tone to indicate that the receive cycle is over.

Figure 5:
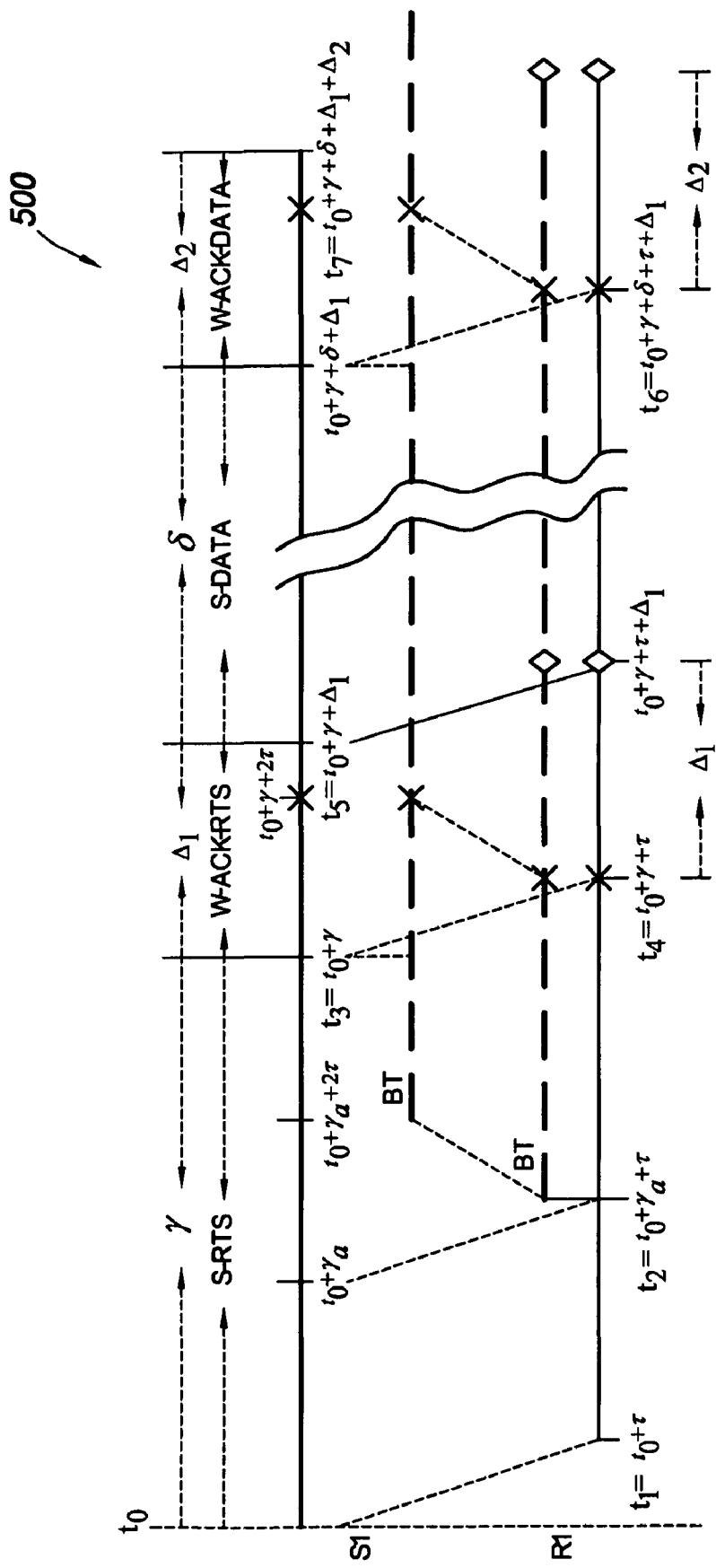

Referring to FIG. 5, a timing diagram 500 illustrates another embodiment of an operation using the ABTMA/ACK protocol. The present example differs from the embodiment of FIG. 4 in that the receiving node 104 uses the busy tone to acknowledge receipt of the data. Because times $t_0$ through $t_6$ are similar to those described above with respect to FIG. 4, the present example begins at time $t_6$ after the data is received. After sending the data, the node 102 sets a timer for $\Delta_2$ seconds to wait for the node 104 to acknowledge receiving the data.

At time $t_6=t_5+\delta+\tau=t_0+\gamma+\delta+\tau+\Delta_1$, instead of turning off the busy tone upon receipt of the data as described with respect to FIG. 4, the node 104 continues to send the busy tone for $\Delta_2$ seconds in order to acknowledge that it has received the data. In the present example, $\Delta_2$ should be larger than $2\Gamma$ to ensure that the busy tone is received by the node 102. At the end of $t_6+\Delta_2$, the node 104 finishes a receiving cycle and turns off the busy tone.

At time $t_7=t_5+\delta+\Delta_2=t_0+\gamma+\delta+\Delta_1+\Delta_2$, the node 102 has received acknowledgement that its data transmission has been successfully received by the node 104 and finishes a transmit cycle. Accordingly, the busy tone can be used to acknowledge the receipt of the data, as well as the receipt of the RTS packet.

Figure 6:
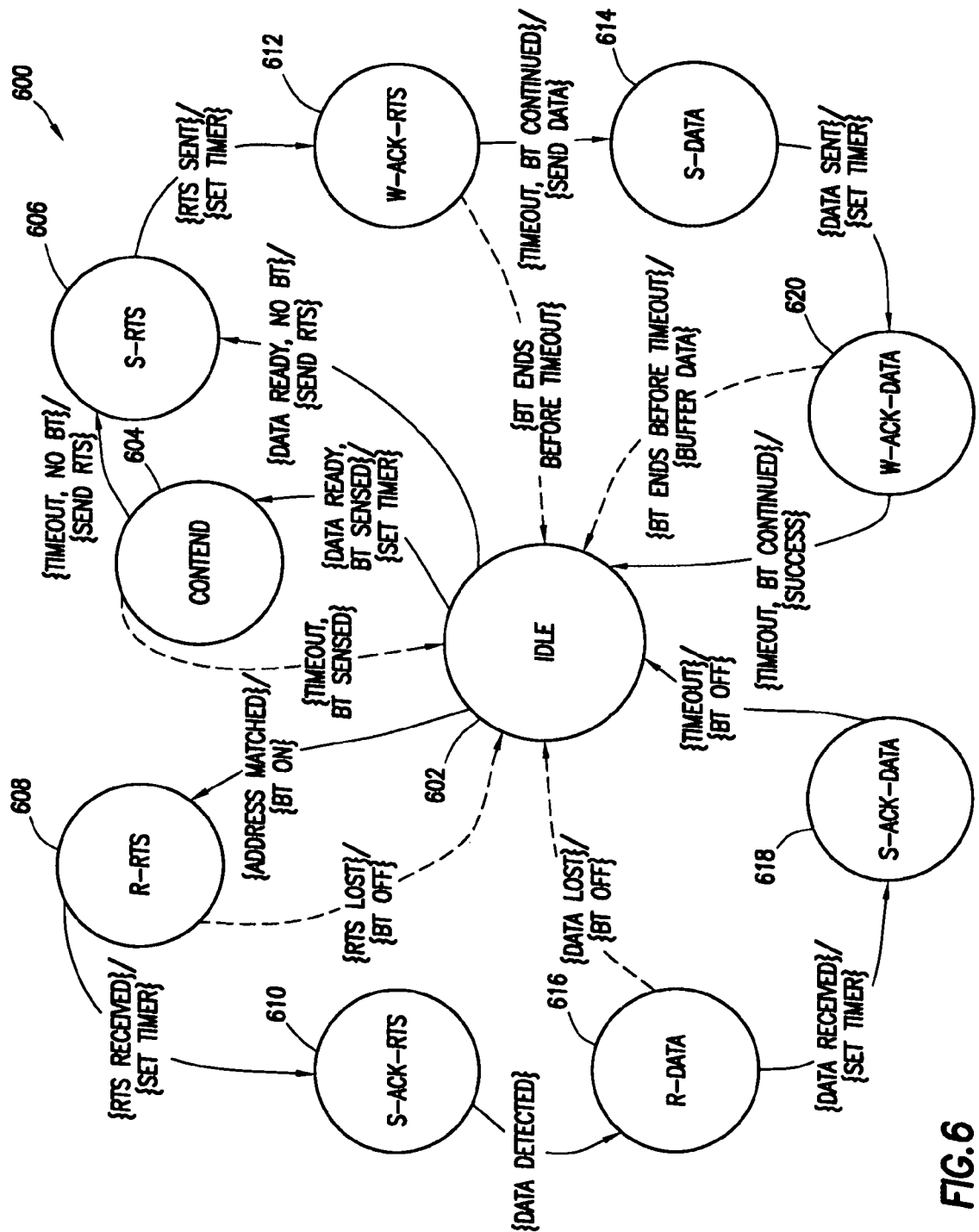
FIG. 6 is a diagram of one embodiment of a state machine that may be used to implement the timing sequence of FIG. 5.

Referring to FIG. 6, one embodiment of a finite state machine 600 is illustrated with states corresponding to the timing diagram 500 of FIG. 5. The state machine 600 of the present example includes ten states, with an IDLE state 602 at the center. A CONTEND state 604 is an intermediate state for a sending node between the IDLE state 602 and a S-RTS state 606. Symmetrically, the states 606, 612, 614, and 620 (illustrated on the right side of the state machine 600) are sender-involved and the states 608, 610, 616, and 618 (illustrated on the left side of the state machine 600) are receiver-involved. The following description of the state machine 600 moves through the states in the order in which they may occur in a successful transmission/reception scenario.

The IDLE state 602 is entered after a node (e.g., the node 102 or node 104 of FIG. 1) is powered up. The node remains in the IDLE state 602 if it does not become involved in sending or receiving activities. The IDLE state 602 is the state to which most of the other states return if certain events happen, as will be described below in detail with respect to each state. In the present example, if a node in the IDLE state 602 has a data packet ready to send, the node is in data sending mode. Otherwise, the node is in receiving mode.

The CONTEND state 604 is an intermediary state. When a sending node (e.g., the node 102) has a data packet ready for transmission to a receiving node (e.g., the node 104), the node 102 first determines whether there is a busy tone being emitted. As previously described, if a busy tone is sensed, the node 102 will refrain from sending so as not to interrupt an existing transmission. Instead, the node 102 starts a timer according to a predefined backoff process and enters the CONTEND state 604. When the timer expires, the node 102 again determines if a busy tone is being emitted. If it detects a busy tone again, the node 102 returns to the IDLE state 602 and starts the process again from there. If no busy tone is detected, the node 102 proceeds to the S-RTS state 606.

The S-RTS state 606 may be entered in two ways. In addition to entering the S-RTS state 606 via the CONTEND state 604, as previously described, the sending node 102 may enter the S-RTS state 606 directly from the IDLE state 602 if a busy tone is not sensed when the node 102 has data ready to send. In the S-RTS state 606, the node 102 sends an RTS packet to the node 104 to indicate that the node 102 has data ready to send. When the node 102 finishes sending the RTS, it sets up a timer of duration $\Delta_1>2\Gamma$ and proceeds to a W-ACK-RTS state 612 to wait for the node 104 to acknowledge the RTS.

An R-RTS state 608 is the state to which a node in the receiving mode of the IDLE state 602 moves after detecting transmission activity in the data channel and matching its own address with that of a received RTS address header. In the present example, while in the IDLE state 602, the node 104 will begin receiving and decoding an RTS address header sent by the node 102. After receiving the address header (which takes $\gamma_a$ seconds) and matching the node 104's own address with the received address, the node 104 turns on the busy tone and moves to the R-RTS state 608, where the node 104 continues to receive the rest of the RTS packet. If the address does not match, the node 104 remains in the IDLE state 602.

The receiving node 104 proceeds to an S-ACK-RTS state 610 from the R-RTS state 608 after it finishes receiving the entire RTS packet and verifies the received RTS packet. If the RTS packet is received correctly, it continues sending the busy tone until it detects incoming data and then moves to an R-DATA state 616, discussed below. If there is an error in the receipt of the RTS packet, the node 104 turns off the busy tone and returns to the IDLE state 602.

In the W-ACK-RTS state 612, which the node 102 enters from the S-RTS state 606, the node 102 attempts to detect a busy tone. If there is no busy tone or if the busy tone ends before the expiration of the timer set in the S-RTS state 606, the node 102 determines that the RTS transmission has failed and returns to the IDLE state 602 for a fresh restart. If the busy tone remains on until the expiration of the timer, the node 102 will begin to send data to the node 104. As described above, the duration of the timer in the present example is set to $\Delta_1>2\Gamma$, which avoids accepting a delayed busy tone as an acknowledgment.

The node 102 enters a S-DATA state 614 after receiving acknowledgement of the RTS transmission in the W-ACK-RTS state 612. In the S-DATA state 614, the node 102 transmits the data packet. After finishing transmission of the data, the node 102 starts a timer of duration $\Delta_2 > 2\Gamma$ and enters a W-ACK-DATA state 620.

The node 104 enters the R-DATA state 616 (for a receiving node) from the S-ACK-RTS state 610 automatically when a data packet arrives. After receiving the data packet, the node 104 moves to an S-ACK-DATA state 618.

In the S-ACK-DATA state 618, the node 104 verifies the received data packet. If an error is detected, the node 104 powers off the busy tone and returns to the IDLE state 602. If no error is detected, the node 104 continues sending the busy tone for $\Delta_2$ seconds to acknowledge receiving the data. After $\Delta_2$ seconds, the node 104 powers off the busy tone and returns to the IDLE state 602.

The node 102 enters the W-ACK-DATA state 620 after setting the timer for $\Delta_2$ in the S-DATA state 614. While in the W-ACK-DATA state 620, the node 102 continues to sense for a busy tone. If it does not detect a busy tone or if the busy tone ends before the expiration of the timer, the node 102 determines that the data packet has not been correctly received by the node 104. Accordingly, the node 102 buffers the data for retransmission in the future and returns to the IDLE state 602. If the node 102 continues to detect the busy tone until the time expires, it knows that the node 104 has received the data packet correctly and returns to the IDLE state 602.

It is understood that modifications may be made to the state machine 600 of FIG. 6. For example, with respect to FIG. 4, which does not include an acknowledgement of the data packet as described in FIG. 5, the S-ACK-DATA state 618 may not leave the busy tone on for $\Delta_2$ seconds and the W-ACK-DATA state 620 may not be implemented. Accordingly, various alterations may be made to the state machine 600 to enable it to perform in a desired manner.

The above embodiments illustrate that ABTMA/ACK is designed to take into account various types of conflicts that may be present in ad hoc wireless networks. For example, the parameters $\Delta_1$, $\Delta_2$, $\gamma_a$ and $\gamma$ may be specified to resolve hidden/exposed-node problems for avoiding data collisions, minimize RTS collisions, and optimize spectrum efficiency.

The following paragraphs provide a series of proofs to detail a mathematical foundation for the various embodiments described above. It is understood that the following proofs are for purposes of example only, and are not intended to be limiting. For purposes of convenience, the following paragraphs use the terms "sender" and "$S_x$" for a sending node, and "receiver" and "$R_x$" for a receiving node. The following four equations illustrate a relationship between various parameters used above.

$$\Delta_1 > 2\Gamma \quad \text{(Eq. 1)}$$

$$\gamma_a > \Delta_1, \Delta_2 \quad \text{(Eq. 2)}$$

$$\gamma - \gamma_a > 2\Gamma \quad \text{(Eq. 3)}$$

$$\Delta_2 > 2\Gamma \quad \text{(Eq. 4)}$$

Theorem 1: In ABTMA/ACK, a sender $S_1$ who has sent an RTS packet and sensed a busy tone at the end of the W-ACK-RTS state (i.e., $\Delta_1$ seconds after the end of the RTS transmission), is acknowledged of its RTS transmission uniquely by a targeted receiver $R_1$.

Proof of Theorem 1: Suppose that node $S_1$ starts sending an RTS packet to node $R_1$ at time $t_0$. To be able to initiate the RTS transmission, $S_1$ should not hear a busy tone at $t_0$. Assume there is a competing receiver (e.g., $R_2$) within $S_1$'s coverage area trying to respond to an RTS transmission attempt from other senders.

Consider the case that $R_2$ turns on its busy tone before the arrival of $S_1$'s RTS. The earliest time $R_2$ can turn on the busy tone is $t_1 = t_0 - \tau$, where $\tau$ is the propagation delay between $R_2$ and $S_1$. $R_2$ cannot finish receiving the competing RTS packets until $t_2 = t_1 + \gamma - \gamma_a = t_0 - \tau + \gamma - \gamma_a$. On the other hand, the RTS packet from $S_1$ will reach $R_2$ no later than $t_3 = t_0 + \tau$. Given $\gamma - \gamma_a > 2\Gamma$ (Eq. 3), then $t_3 < t_2$, which means $R_2$ cannot succeed in receiving the competing RTS packet given the timely interference from $S_1$.

This illustrates that all other competing receivers have to give up their receiving attempt (i.e., they must turn off their busy tone at the end of the receipt of the competing RTS packets). The latest time $R_2$ can decode the address header of the competing RTS packet and then initiate a competing busy tone is at $t_3$. Hence, the latest time $R_2$ must turn off its busy tone is $t_4 = t_3 + \gamma - \gamma_a = t_0 + \tau + \gamma - \gamma_a$. All the competing busy tone signals except the one from $R_1$ will disappear at $S_1$ at $t_5 = t_4 + \tau = t_0 + 2\tau + \gamma - \gamma_a$.

If it does not turn on its busy tone before the arrival of $S_1$'s RTS, $R_2$ cannot receive competing RTS packets sent by the other sender until the last bit of $S_1$'s RTS passes it. However, $S_1$'s data packet will arrive at $R_2$ no later than $\Delta_1$. Given $\gamma_a > \Delta_1$ (Eq. 2), $R_2$ cannot turn on its busy tone during $S_1$'s quiet time between sending the RTS and data packets.

$S_1$ receives the busy tone beginning from $t_6 = t_0 + \gamma + 2\Gamma$ to $t_7 = t_0 + \gamma + \Delta_1$ as the acknowledgement of its RTS transmit. As long as $\Delta_1$ is larger than $2\Gamma$ (Eq. 1), $t_5 < t_6 < t_7$. This proves that all other competing busy tone signals disappear at $S_1$ before the end of the W-ACK-RTS state. Only the target receiver $R_1$ is acknowledging the RTS transmit.

Note that Theorem 1 illustrates that there is no need for using a CTS packet to identify the receiver-sender pair. There is no ambiguity of who should send data at the end of the W-ACK-RTS state.

Lemma 1: There is no RTS-and-DATA collision in ABTMA/ACK.

Proof of Lemma 1: Suppose that $R_1$ is receiving an RTS packet from $S_1$, while another node H (a hidden node) who is $\tau$ seconds away from $R_1$'s coverage area is trying to send a competing RTS packet. At time $t_1$, $R_1$ turns on its busy tone after successfully matching its own address with the received RTS address header. At time $t_2 = t_1 + \tau$, the busy tone reaches H, who will not initiate an RTS transmission after $t_2$ and before the busy tone disappears. Considering all the cases for node H, no node can initiate an RTS transmission after max $\{t_2\} = t_1 + \Gamma$ and before the busy tone disappears.

Moreover, given $R_1$ successfully receiving $S_1$'s RTS packet, H should not be sending a competing RTS packet in the interval $[t_1 - \gamma_a - \tau, t_2]$. Otherwise, the competing RTS packet would have reached $R_1$ at the interval $[t_1 - \gamma_a, t_2 + \tau]$. Note that, $$[t_1 - \gamma_a, t_2 + \tau] = [t_1 - \gamma_a, t_1 + 2\tau] \quad \text{(Eq. 5)}$$

$$[t_1 - \gamma_a, t_1 + 2\tau] = [t_1 - \gamma_a, t_1] + [t_1, t_1 + 2\tau] \quad \text{(Eq. 6)}$$

The competing transmission at the interval $[t_1 - \gamma_a, t_1]$ would have destroyed the reception of the address header of $S_1$'s RTS at $R_1$. The competing RTS in the interval $[t_1, t_1 + 2\tau]$ would have destroyed the reception of the RTS since $R_1$ cannot finish receiving the original RTS until (refer to Eq. 3):

$$t_3 = t_1 + \gamma - \gamma_a > t_1 + 2\Gamma \quad \text{(Eq. 7)}$$

Accordingly, it is illustrated that, given $R_1$ successfully receiving $S_1$'s RTS, no competing RTS should arrive at $R_1$ beginning from $t_1 - \gamma_a$. The data from $S_1$ will not reach $R_1$ until $t_4 = t_1 + \gamma - \gamma_a \Delta_1$. This illustrates that there is no collision between RTS and data in ABTMA/ACK.

Lemma 2: There is no data-and-data collision in ABTMA/ACK.

Proof of Lemma 2: Lemma 2 may be proved using the general example in Lemma 1. In order for node H to send any competing data, node H should send a competing RTS first, and then wait for $\Delta_1$ seconds in the W-ACK-RTS state. In the present illustration, H cannot finish a cycle consisting of the S-RTS, W-ACK-RTS and S-DATA states without interfering with $R_1$'s receipt of $S_1$'s RTS.

It is shown in Lemma 1, above, that given $R_1$'s successful receipt of $S_1$'s RTS, H should not send a competing RTS in the interval $[t_1-\gamma_a-\tau, t_2]$. H must finish transmitting a competing RTS before $t_5=t_1-\gamma_a-\tau$. If the competing RTS were correctly accepted by a certain receiver, say $R_2$, H should start transmitting a competing data packet at $t_6$ according to the ABTMA/ACK process, where $t_6=t_5+\Delta_1$.

This competing data should reach $R_1$ at $t_7=t_6+\tau=t_1-\gamma_a\Delta_1$. However, $R_1$ cannot finish receiving $S_1$'s RTS until $t_8=t_1+\gamma-\gamma_a$. Then, $$t_8-t_7=\gamma-\Delta_1>0 \qquad (\text{Eq. 8})$$

because, as can be seen by Eqs. 1-3, $\Delta_1<\gamma_a<\gamma$. This means that H's data would have destroyed $R_1$'s receipt of $S_1$'s RTS, which is contradictory to the assumption that $R_1$ successfully received $S_1$'s RTS.

This illustrates that no other nodes can send competing data while $R_1$ is receiving data from $S_1$. There is no data-and-data collision in ABTMA/ACK.

Theorem 2: A successful RTS receipt implies a successful data packet transmission following the RTS transmission in ABTMA/ACK.

Proof of Theorem 2: The only way to interfere with an existing data transmission is by another competing RTS and/or data packet. Lemma 1 and Lemma 2 illustrate that there is no competing RTS transmission or data transmission within the coverage of the receiver who is receiving a data packet. A data transmission following a successful RTS transmission is free of collisions in ABTMA/ACK.

Corollary 1: Exposed nodes cannot be trapped in a receiving situation by mistake. Hidden nodes cannot transmit competing RTS or data packets.

Proof of Corollary 1: FIG. 7a illustrates a situation where an exposed node E is trapped in a receiving situation while $S_1$ is sending data to $R_1$. When the ABTMA/ACK process is applied, $S_1$ would sense the busy tone from more than one receiver after the W-ACK-RTS state, which is contradictory to Theorem 1.

FIG. 7b illustrates a situation where the hidden node H is trapped in a transmitting situation while $S_1$ is sending data to $R_1$. When the ABTMA/ACK process is applied, there would be a data-and-data collision at $R_1$, which is contradictory to Theorem 2. In conclusion, ABTMA/ACK prevents hidden-nodes from transmitting and exposed-nodes from receiving.

Corollary 2: Exposed nodes are allowed to transmit. Hidden nodes are allowed to receive.

Figure 7C:
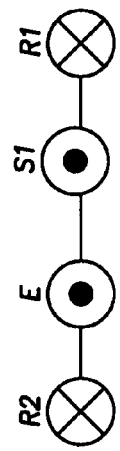
Figure 7D:
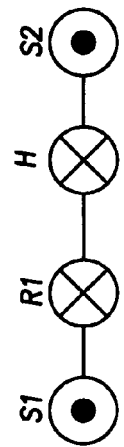

Proof of Corollary 2: The two situations of Corollary 2 are illustrated in FIGS. 7c and 7d. Exposed node E does not hear a busy tone from $R_1$ and may transmit data to a receiver $R_2$ that is out of $S_1$'s coverage area (FIG. 7c). Hidden node H is not affected by the transmission from $S_1$ and is free to receive data from a sender $S_2$ who is out of $R_1$'s coverage area (FIG. 7d). Accordingly, the concurrent transmissions do not affect each other and ABTMA/ACK may be used to maximize the number of concurrent transmissions in ad hoc networks.

Although only a few exemplary embodiments of this disclosure have been described in details above, those skilled in the art will readily appreciate that many modifications are possible in the exemplary embodiments without materially departing from the novel teachings and advantages of this disclosure. For example, although an RTS packet is used for purposes of illustration, it is understood that other types of packets may be substituted for or used in addition with the RTS packet. In addition, while the term "packet" is used for purposes of example, it is understood that the present disclosure applies to any type of transmission using a defined transmission unit, including packets, datagrams, and frames, and that the term "packet" represents any such unit. Also, features illustrated and discussed above with respect to some embodiments can be combined with features illustrated and discussed above with respect to other embodiments. Accordingly, all such modifications are intended to be included within the scope of this disclosure.

What is claimed is:

1. A method for use in an ad hoc network using a tone emitted by a receiving node, the method comprising:
   receiving a first portion of a Request To Send (RTS) packet from a sending node at the receiving node, wherein the first portion of the RTS packet contains a destination address of the packet;
   emitting a tone by the receiving node if the receiving node determines that the received destination address matches an address of the receiving node;
   receiving, by the receiving node from the sending node, a second portion of the RTS packet containing a request for transmitting data from the sending node to the receiving node; and
   continuing to emit the tone for at least a first predefined period of time after receiving the request.

2. The method of claim 1 further comprising stopping the emitting of the tone if an error occurs while receiving the request.

3. The method of claim 2 further comprising:
   receiving, by the receiving node from the sending node, data corresponding to the request; and
   stopping the emitting of the tone if an error occurs while receiving the data.

4. The method of claim 3 further comprising stopping the emitting of the tone directly after the data is received by the receiving node.

5. The method of claim 3 further comprising continuing to emit the tone for at least a second predefined period of time after receiving the data.

6. The method of claim 5 wherein the second predefined period of time is defined as having a duration at least equal to a maximum two-way propagation delay of a coverage area of the receiving node.

7. The method of claim 5 wherein the tone is emitted continuously from when the receiving node determines that the received destination address matches the address of the receiving node to the end of the second predefined period of time if no errors occur in receiving the request and the data.

8. The method of claim 1 wherein the first predefined period of time is defined as having a duration at least equal to a maximum two-way propagation delay of a coverage area of the receiving node.

9. The method of claim 1 wherein the tone is a busy tone.

10. A method for use in an ad hoc network using a tone emitted by a receiving node, the method comprising:
    attempting, by a sending node, to detect a tone emitted by a receiving node;
    sending a Request To Send (RTS) packet containing a request for a data transmission to the receiving node by the sending node if no tone is detected; and determining, by the sending node, whether a detected tone remains on for a first predefined period of time after sending the RTS packet to the receiving node, and upon determining that the detected tone remains on for the first predefined period of time, sending data to the receiving node.

11. The method of claim 10 further comprising:
determining a channel quality based on the detected tone; and
adjusting a sending rate of the data to the receiving node based on the channel quality.

12. The method of claim 10 further comprising returning, by the sending node, to an idle state if the tone does not remain on during the first predefined period of time.

13. The method of claim 10 further comprising determining, by the sending node, whether the tone remains on for a second predefined period of time after transmitting the data.

14. The method of claim 13 wherein the second predefined period of time is defined as having a duration at least equal to a maximum two-way propagation delay of a coverage area of the sending node.

15. The method of claim 13 further comprising returning, by the sending node, to an idle state if the tone does not remain on during the second predefined period of time.

16. The method of claim 10 further comprising, if a tone is detected prior to sending the request, setting a timer and attempting to detect the tone after the timer expires.

17. The method of claim 10 wherein the tone is a busy tone.

18. A method for use in an ad hoc network comprising:
sending a Request To Send (RTS) packet from a first node, the RTS packet having an initial portion and a remaining portion;
receiving at the first node a tone from the second node if the RTS packet is intended for the second node, wherein the remaining portion of the RTS packet is received by the second node while the tone is being emitted, and wherein the tone is emitted for a first time period after the remaining portion is received;
determining, by the first node, whether the tone is emitted by the second node for a second time period beginning after the remaining portion of the RTS packet is sent to the second node; and
sending data from the first node to the second node if the tone is emitted for the entire second time period.

19. The method of claim 18 further comprising:
receiving, at the first node, the tone from the second node for a third time period after sending the data; and
determining, by the first node, whether the tone is emitted by the second node for a fourth time period after sending the data.

20. The method of claim 19 wherein the first, second, third, and fourth time periods are defined as having a duration equal to at least a maximum two-way propagation delay of a coverage area of the first node.

21. The method of claim 18 further comprising stopping the emitting of the tone by the second node if an error occurs while receiving the remaining portion of the request.

22. The method of claim 18 further comprising determining whether a tone is being emitted prior to sending the RTS packet, wherein the first node does not send the RTS packet if a tone is being emitted.

23. A receiving node for use within an ad hoc network comprising:
a wireless communication system;
a processor coupled to the wireless communication system; and
a memory containing a plurality of instructions for execution by the processor, the instructions including instructions for:
receiving an address portion of a Request To Send (RTS) packet from a sending node, wherein the address portion includes a destination address of the RTS packet;
comparing the destination address with an address of the receiving node; and
emitting a tone if the destination address matches the address of the receiving tone;
receiving a remaining portion of the RTS packet; and
continuing to emit the tone for a first time period after the entire remaining portion is received.

24. The receiving node of claim 23 further comprising instructions for:
starting a timer of a second time period after receiving a data packet from the sending node; and
emitting the tone for the second time period after the entire data packet is received.

25. The receiving node of claim 24 wherein the first and second time periods have a duration of at least a maximum two-way propagation delay of a coverage area of the receiving node.

26. The receiving node of claim 23 further comprising instructions for stopping the tone prior to the end of the first time period if an error occurs when receiving the remaining portion of the RTS packet.

27. The receiving node of claim 23 wherein the tone is a busy tone.

28. The receiving node of claim 23 wherein the remaining portion of the RTS packet contains a request for transmitting data from the sending node to the receiving node.

29. A sending node for use within an ad hoc network comprising:
a wireless communication system;
a processor coupled to the wireless communication system; and
a memory containing a plurality of instructions for execution by the processor, the instructions including instructions for:
sending a Request To Send (RTS) packet to a receiving node if a tone is not detected;
starting a timer of a first time period after the entire RTS packet is sent, wherein the first time period is at least equal to a maximum two-way propagation delay of a coverage area of the sending node; and
sending a data packet to the receiving node only if the tone is emitted during the entire first time period.

30. The sending node of claim 29 further comprising instructions for:
starting a timer of a second time period after the data packet is sent; and
determining whether the tone is emitted during the entire second time period.

31. The sending node of claim 30 further comprising instructions for buffering the data packet if the tone is not emitted during the entire second time period.

32. The sending node of claim 29 wherein the tone is a busy tone.

33. The sending node of claim 29 wherein the RTS packet contains a request for a data transmission to the receiving node by the sending node.

* * * * *